United States Patent
Gause

(10) Patent No.: US 9,969,436 B1
(45) Date of Patent: May 15, 2018

(54) RETRACTABLE MUD FLAP SYSTEM

(71) Applicant: Raymond Gause, Rochester, NY (US)

(72) Inventor: Raymond Gause, Rochester, NY (US)

( * ) Notice: Subject to any disclaimer, the term of this patent is extended or adjusted under 35 U.S.C. 154(b) by 0 days. days.

(21) Appl. No.: 15/805,294

(22) Filed: Nov. 7, 2017

(51) Int. Cl.
*B62D 25/18* (2006.01)
*B60R 16/03* (2006.01)
*B60R 16/023* (2006.01)

(52) U.S. Cl.
CPC .......... *B62D 25/182* (2013.01); *B60R 16/023* (2013.01); *B60R 16/0307* (2013.01)

(58) Field of Classification Search
CPC .... B62D 25/182; B62D 25/18; B62D 25/184; B62D 25/186; B62D 25/188; B60R 16/023; B60R 16/0307
See application file for complete search history.

(56) References Cited

U.S. PATENT DOCUMENTS

| | | | | |
|---|---|---|---|---|
| 2,721,760 A * | 10/1955 | Lapham | ................ | B62D 25/188 280/848 |
| 2,857,200 A * | 10/1958 | Hoppesch | ............ | B62D 25/188 280/851 |
| 3,248,126 A * | 4/1966 | Saxton | ................. | B62D 25/188 280/851 |
| 3,310,344 A * | 3/1967 | Beintum | ............... | B62D 25/188 280/851 |
| 3,507,513 A * | 4/1970 | Bohrer | ................. | B62D 25/188 280/851 |
| 3,802,739 A * | 4/1974 | Knyszel | ............... | B62D 25/188 280/851 |
| 4,097,090 A | 6/1978 | Payne | | |
| D281,966 S | 12/1985 | Lockwood | | |
| 5,582,431 A * | 12/1996 | Anderson | ............ | B62D 25/188 280/851 |
| 6,139,062 A * | 10/2000 | Meyer | ..................... | B60P 1/283 280/847 |
| 6,158,775 A | 12/2000 | Nickels | | |
| 6,446,900 B1* | 9/2002 | Syska | .................. | B62D 25/188 242/398 |
| 6,565,122 B1* | 5/2003 | Hansen | ................ | B62D 25/188 280/851 |
| 6,623,038 B2* | 9/2003 | Heem | .................. | B62D 25/188 280/847 |
| 6,799,808 B1 | 10/2004 | Walters | | |

(Continued)

FOREIGN PATENT DOCUMENTS

CA          2197731 A1    2/1996

*Primary Examiner* — Jacob B Meyer
(74) *Attorney, Agent, or Firm* — Kyle A. Fletcher, Esq.

(57) ABSTRACT

The retractable mud flap system comprises two tracks, a chute, and a flap carrier. The invention is used to retract and extend a mud flap on a truck and is commonly used in pairs of two so that a mud flap on each side of the truck may be retracted. The retractable mud flap system attaches to the underside of a truck's dump bed or to extensions of the truck frame above the rear wheel. The flap carrier comprises two roller assemblies and a flap clip. A mud flap is coupled to the flap clip and passes through the chute. The roller assemblies move on the tracks with the flap clip mounted between them. A control located within the cab activates a motor on one roller assembly, moving the roller assemblies and the mud flap. A remote control embodiment is also described.

14 Claims, 7 Drawing Sheets

(56) References Cited

U.S. PATENT DOCUMENTS

| | | | | |
|---|---|---|---|---|
| 7,021,665 B2* | 4/2006 | Keller | ............... | B62D 25/182 |
| | | | | 280/154 |
| 7,185,920 B2* | 3/2007 | Drummond | .......... | B62D 25/168 |
| | | | | 280/770 |
| 7,708,315 B1* | 5/2010 | Dumitrascu | ......... | B62D 25/188 |
| | | | | 280/848 |
| 7,850,206 B2* | 12/2010 | Proctor | ............... | B62D 25/188 |
| | | | | 280/848 |
| 8,864,176 B2 | 10/2014 | Lasser | | |
| 9,352,786 B1 | 5/2016 | Martin | | |
| 2002/0074790 A1* | 6/2002 | Heem | ............... | B62D 25/188 |
| | | | | 280/851 |
| 2003/0184078 A1* | 10/2003 | Grable | ............... | B62D 25/188 |
| | | | | 280/847 |
| 2004/0164539 A1* | 8/2004 | Bernard | ............. | B62D 25/182 |
| | | | | 280/848 |
| 2013/0285358 A1* | 10/2013 | Lasser | ............... | B62D 25/182 |
| | | | | 280/848 |
| 2017/0137070 A1* | 5/2017 | Proctor | ............. | B62D 25/182 |

\* cited by examiner

RETRACTABLE MUD FLAP SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of commercial transportation equipment, more specifically, a retractable mud flap system.

SUMMARY OF INVENTION

The retractable mud flap system comprises two tracks, a chute, and a flap carrier. The invention is used to retract and extend a mud flap on a truck and is commonly used in pairs of two so that a mud flap on each side of the truck may be retracted. The retractable mud flap system attaches to the underside of a truck's dump bed or to extensions of the truck frame above the rear wheel. The flap carrier comprises two roller assemblies and a flap clip. A mud flap is coupled to the flap clip and passes through the chute. The roller assemblies move on the tracks with the flap clip mounted between them. A control located within the cab activates a motor on one roller assembly, moving the roller assemblies and the mud flap. A remote control embodiment is also described.

An object of the invention is to provide a device that retracts and extends mud flaps on a truck.

Another object of the invention is to provide a retractable mud flap system that can be activated using a control located within the cab of the truck.

A further object of the invention is to provide a retractable mud flap system that can be activated using a remote control.

These together with additional objects, features and advantages of the retractable mud flap system will be readily apparent to those of ordinary skill in the art upon reading the following detailed description of the presently preferred, but nonetheless illustrative, embodiments when taken in conjunction with the accompanying drawings.

In this respect, before explaining the current embodiments of the retractable mud flap system in detail, it is to be understood that the retractable mud flap system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the retractable mud flap system.

It is therefore important that the claims be regarded as including such equivalent construction insofar as they do not depart from the spirit and scope of the retractable mud flap system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
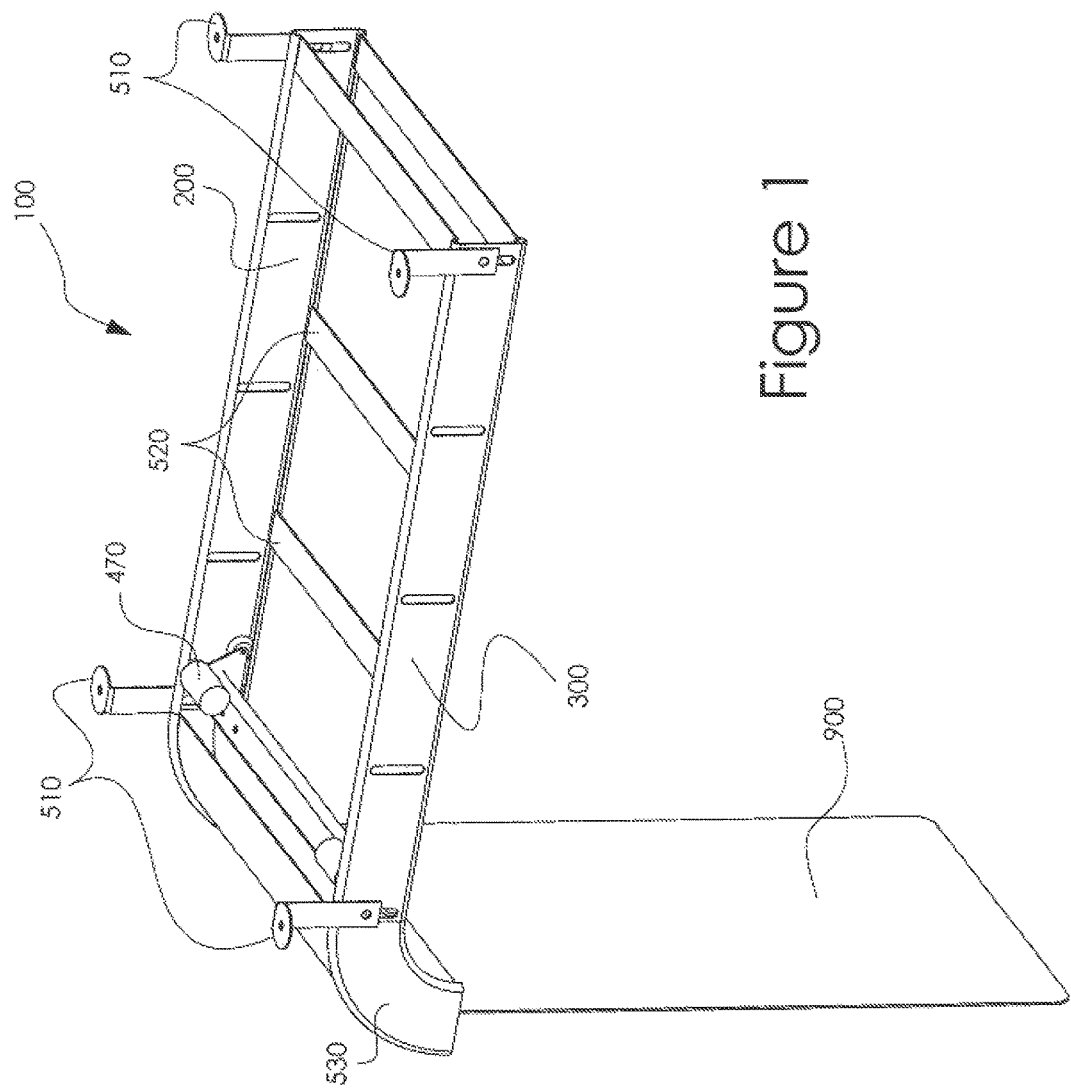
FIG. 1 is a perspective view of an embodiment of the disclosure with the mud flap extended.
Figure 2:
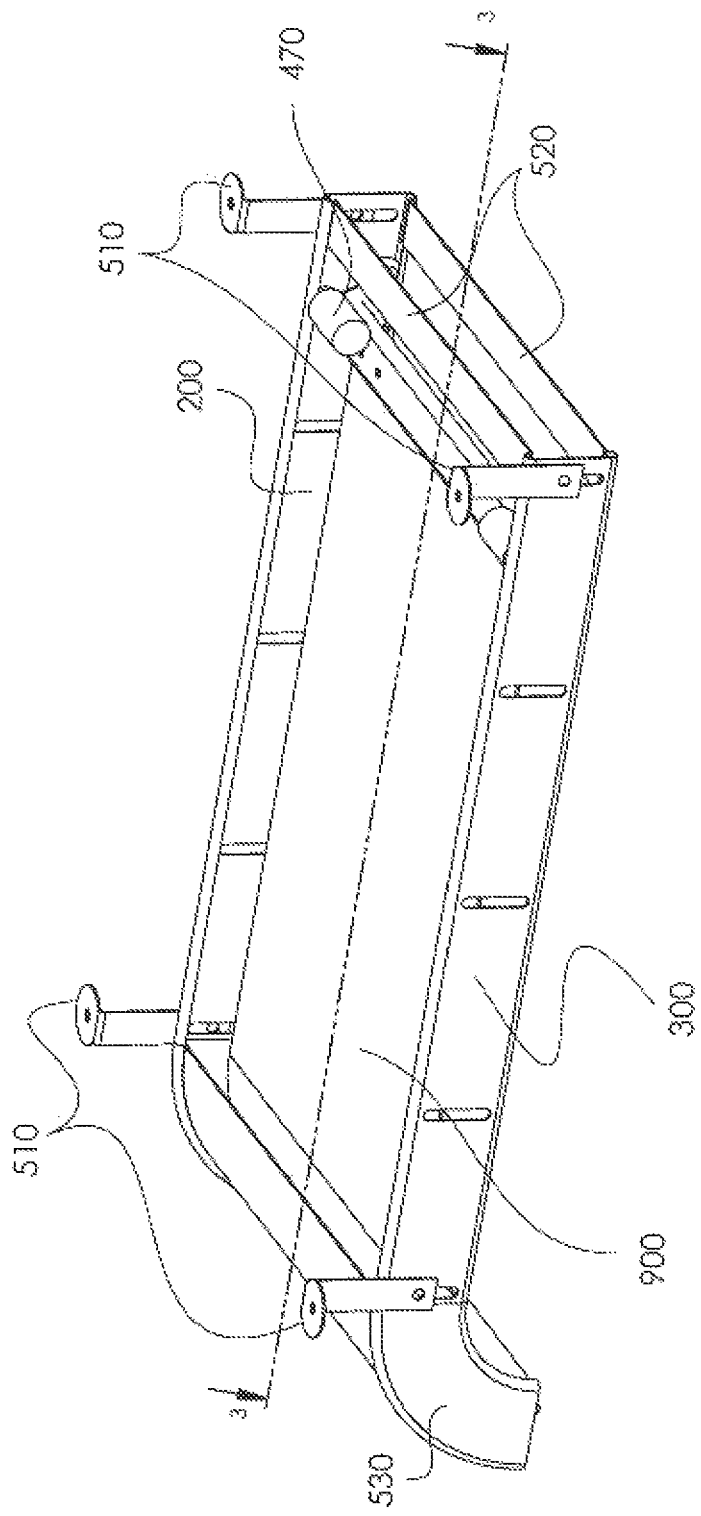
FIG. 2 is a perspective view of an embodiment of the disclosure with the mud flap retracted.
Figure 3:
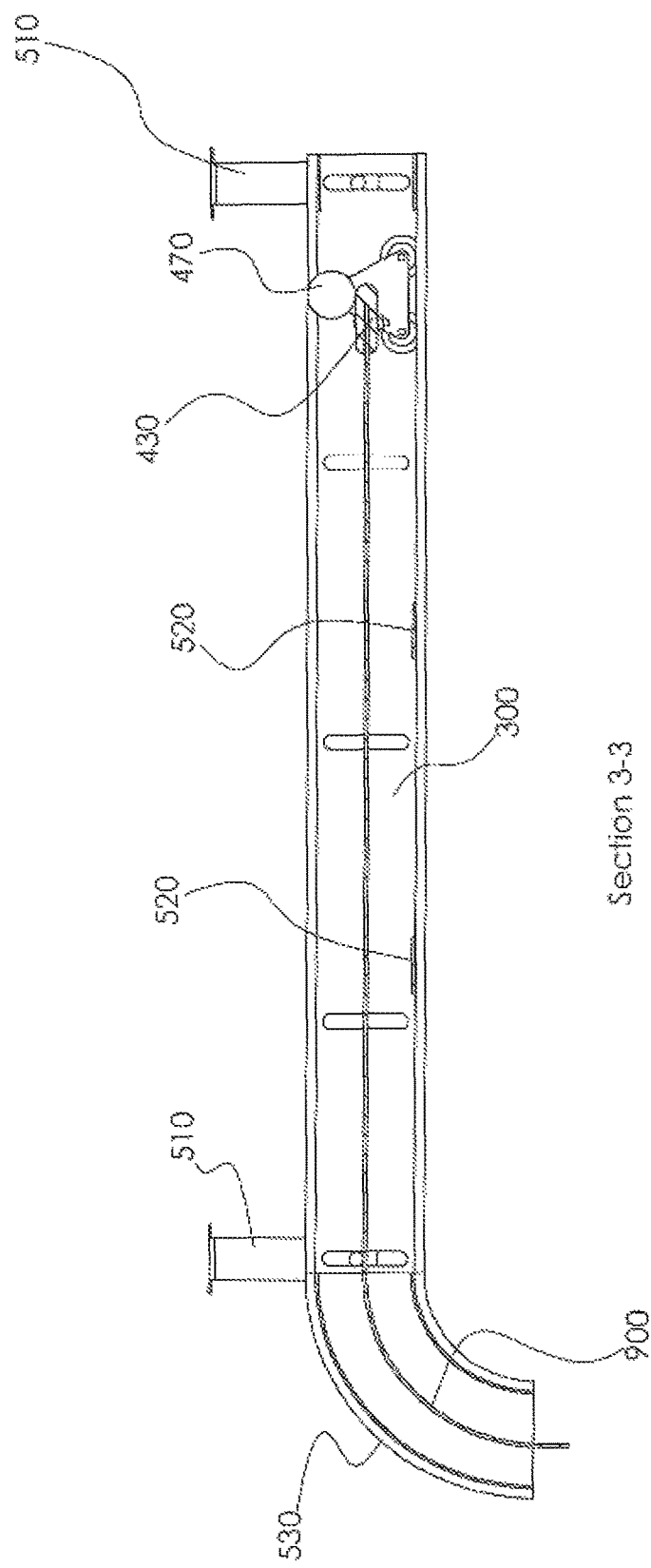
FIG. 3 is a cross-sectional view of an embodiment of the disclosure across 3-3 as shown in FIG. 2.
Figure 4:
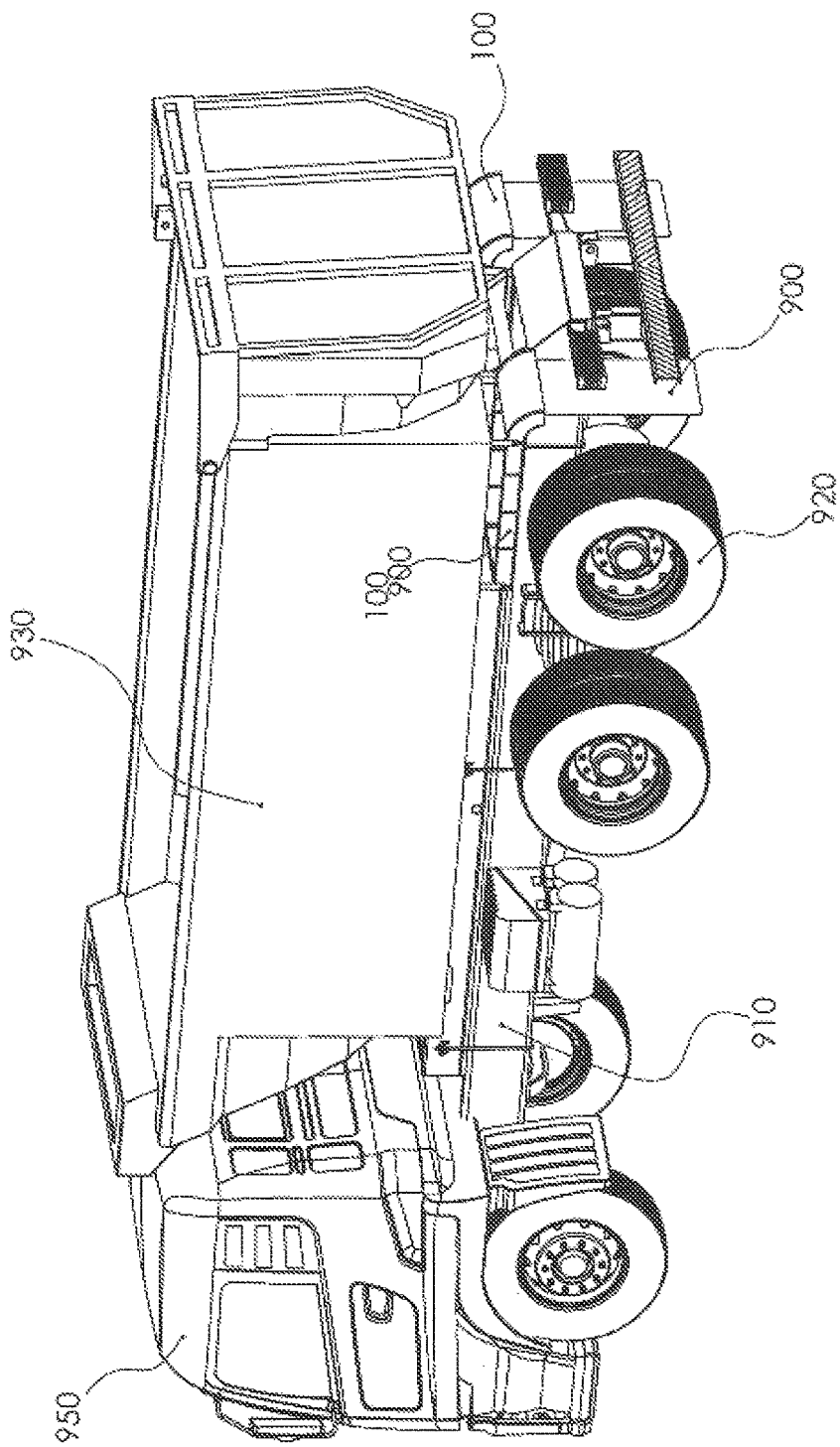
FIG. 4 is an in-use view of an embodiment of the disclosure showing extended mud flaps.
Figure 5:
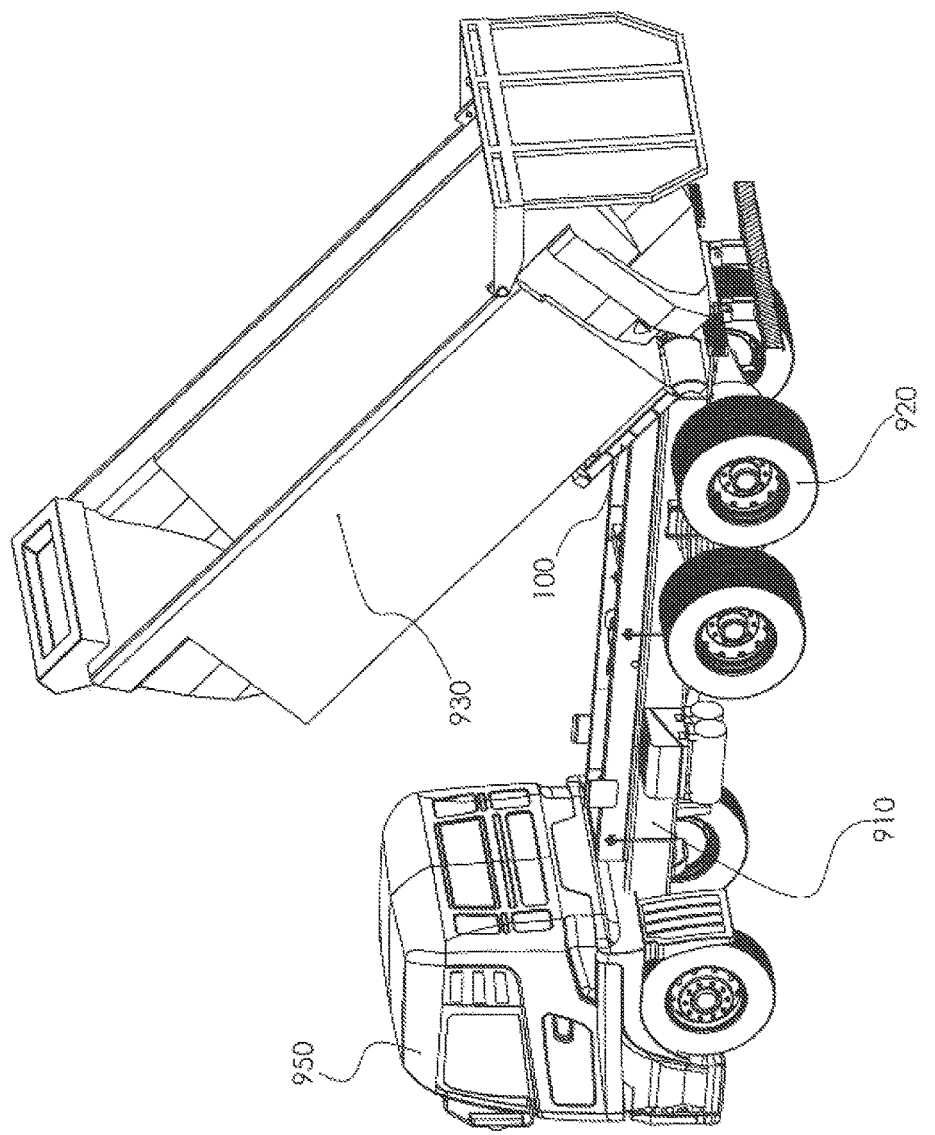
FIG. 5 is an in-use view of an embodiment of the disclosure showing retracted mud flaps.
Figure 6:
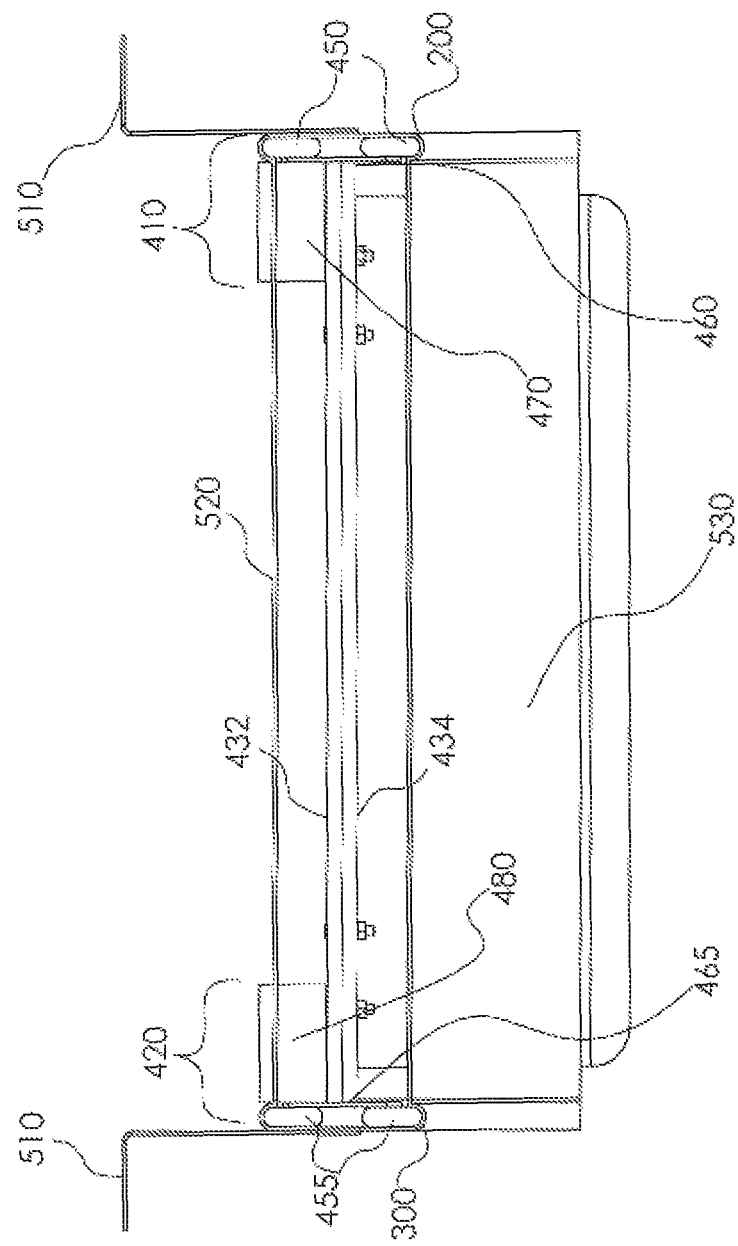
FIG. 6 is a front view of an embodiment of the disclosure.
Figure 7:
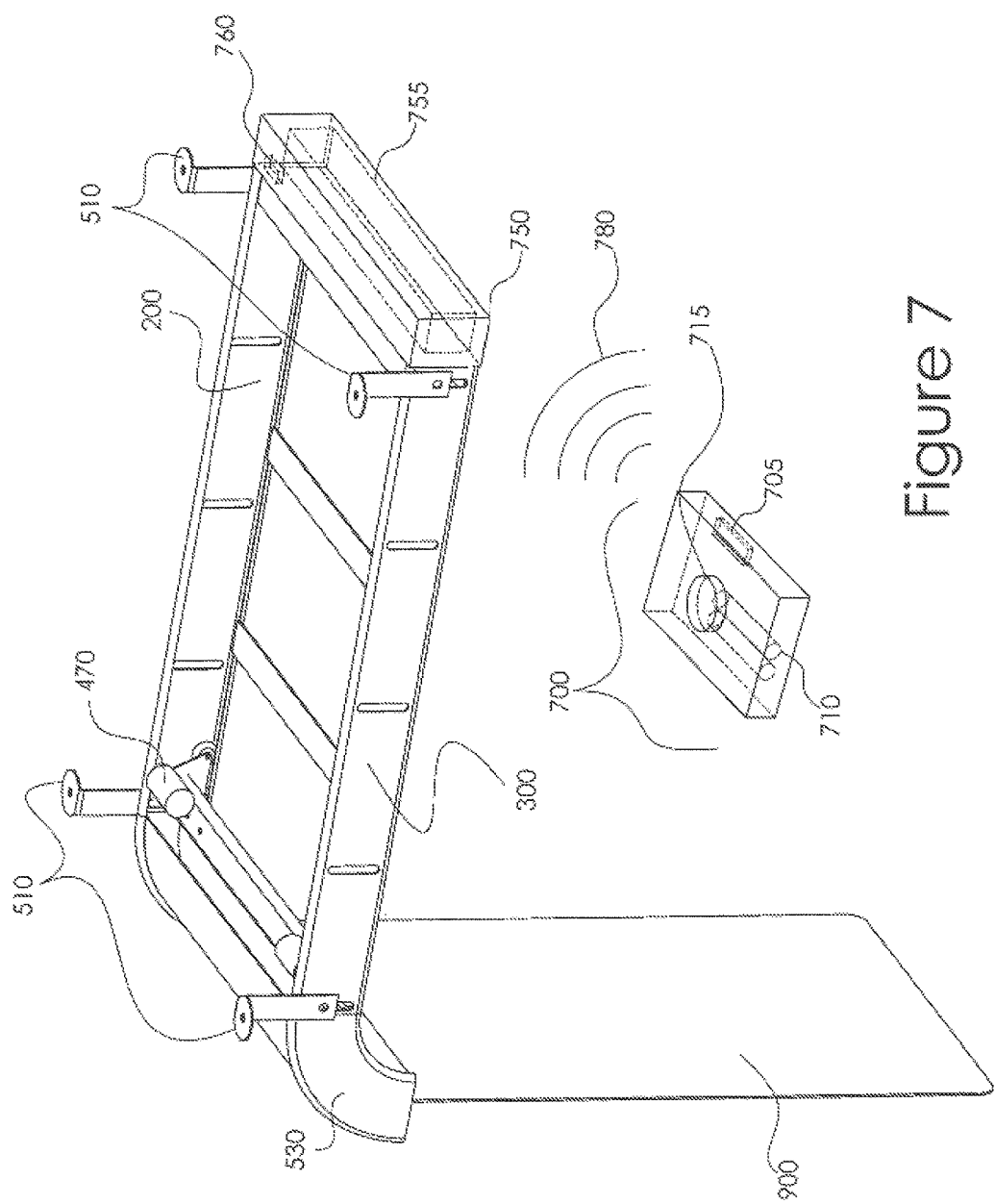
FIG. 7 is a perspective view of an embodiment of the disclosure illustrating remote control of the invention.

Detailed reference will now be made to a first potential embodiment of the disclosure, which is illustrated in FIGS. 1 through 7.

The retractable mud flap system 100 (hereinafter invention) comprises a left track 200, a right track 300, a chute 530, a flap carrier, and a plurality of cross-supports 520. The invention 100 may be attached to a dump bed 930 of a truck 910 above a rear wheel 920 and allows an operator (not illustrated in the figures) to retract a mud flap 900 before backing the truck 910, thus protecting the mud flap 900 from damage. The invention 100 also allows the mud flap 900 to be extended again before traveling on roadways. The invention 100 is commonly used in pairs to protect the mud flap 900 on each side of the truck 910.

Throughout this disclosure, directional terms assume the point of reference of an observer standing behind the truck 910 and looking at the truck 910. Specifically, left and right are defined by the left and right side of a person looking at the back of the truck 910. Front and rear comprise areas that towards the engine compartment and towards the dump bed 930, respectively. Down refers to the direction that gravity pulls an object and up is the opposite of down.

The left track 200 may be a straight, metal C-channel. The length of the left track 200 may be between 25% and 125% of the vertical length of the mud flap 900 when the mud flap 900 is hanging. The left track 200 is oriented such that the longest dimension of the left track 200 runs from front to back and the open side of the C-channel faces the right track 300. The rear end of the left track 200 couples to the left front side of the chute 530.

The right track 300 may be a straight, metal C-channel. The length of the right track 300 may be between 25% and 125% of the vertical length of the mud flap 900 when the mud flap 900 is hanging. The right track 300 is oriented such that the longest dimension of the right track 300 runs from front to back and the open side of the C-channel faces the left track 200. The rear end of the right track 300 couples to the right front side of the chute 530.

The height of the right track 300 is substantially the same as the height of the left track 200. The length of the right track 300 is substantially the same as the length of the left track 200. The right track 300 and the left track 200 parallel each other and remain equidistant along their entire front-to-back length. The right track 300 and the left track 200 may be held at the equidistant spacing by the plurality of cross-supports 520.

The chute 530 may be a curved, hollow passage that redirects the path of the mud flap 900 as the mud flap 900 is retracted into the invention 100 or extended from the invention 100. The width of the chute 530 is substantially the same as the distance from the left side of the left track 200 to the right side of the right track 300. The height of the front of the chute 530 is substantially the same as the height of the left track 200 and the height of the right track 300. The open end of the front of the chute 530 is oriented to accept the mud flap 900 in a horizontal orientation. The chute 530 curves such that the rear of the chute 530 is lower than the front of the chute 530. The open end of the rear of the chute 530 is oriented to accept the mud flap 900 in a vertical orientation.

The left, front side of the chute 530 may couple to the rear end of the left track 200 such that the left side of the chute 530 and the left side of the left track 200 are aligned. The right, front side of the chute 530 may couple to the rear end of the right track 300 such that the right side of the chute 530 and the right side of the left track 200 are aligned.

As the mud flap 900 is retracted by the flap carrier, the mud flap 900 rises vertically into the open end of the chute 530 at the rear of the invention 100 and the mud flap 900 turns 90 degrees as it passes through the chute 530. As the mud flap 900 emerges from the front of the chute 530, it is moving horizontally and is pulled in the space between the left track 200 and the right track 300. The plurality of cross-supports 520 on the lower side of the left track 200 and the right track 300 may prevent the mud flap 900 from sagging and falling in front of the chute 530.

The flap carrier comprises a left roller assembly 410, a right roller assembly 420, a flap clip 430, and a first electric motor 470. The flap carrier may move forward and backwards in the space between the left track 200 and the right track 300 to retract and extend the mud flap 900.

The left roller assembly 410 moves forward and backwards within the left track 200. The left roller assembly 410 may comprise one or more left wheels 450. The left roller assembly 410 couples to the left end of the flap clip 430. The flap clip 430 may couple to a left roller plate 460 which is turn rotationally couples to the one or more left wheels 450.

The first electric motor 470 may couple to the left roller plate 460 and a first shaft (not illustrated in the figures) of the first electric motor 470 may couple to at least one of the one or more left wheels 450.

The right roller assembly 420 moves forward and backwards within the right track 300. The right roller assembly 420 may comprise one or more right wheels 455. The right roller assembly 420 couples to the right end of the flap clip 430. The flap clip 430 may couple to a right roller plate 465 which is turn rotationally couples to the one or more right wheels 455.

In some embodiments, the flap carrier may comprise a second motor 480. The second motor 480 may couple to the right roller plate 465 and a second shaft (not illustrated in the figures) of the second motor 480 may couple to at least one of the one or more right wheels 455.

The flap clip 430 may comprise a first clip plate 432 and a second clip plate 434. The first clip plate 432 and the second clip plate 434 may each have a set of holes (not illustrated in the figures) spaced from left to right across them, with each hole of the set of holes that is located on the first clip plate 432 having a hole in a matching position located on the second clip plate 434. Furthermore, the set of holes on the first clip plate 432 and the set of holes on the second clip plate 434 may match with holes located on the top of the mud flap 900.

The left end of the first clip plate 432 and the left end of the second clip plate 434 couple to the left roller assembly 410. The right end of the first clip plate 432 and the right end of the second clip plate 434 couple to the right roller assembly 420.

To mount the mud flap 900 to the invention 100, the mud flap 900 is sandwiched between the first clip plate 432 and the second clip plate 434 such that two or more holes in the first clip plate 432, the mud flap 900, and the second clip plate 434 align and then a plurality of nuts and bolts (not illustrated in the figures) are passed through the aligned holes and tightened to hold the mud flap 900 in place.

The first shaft of the first electric motor 470 may drive one of the one or more left wheels 450 of the left roller assembly 410. The first electric motor 470 may be energized by the application of electrical energy obtained from a vehicle electrical system (not illustrated in the figures). The electrical energy may be applied to the first electric motor 470 over wiring (not illustrated in the figures) between the invention 100 and the vehicle electrical system. The polarity of the electrical energy determines which direction the first shaft of the first electric motor 470 will rotate. If the first electric motor 470 is energized by electrical energy having a first polarity, the first shaft of the first electric motor 470 will rotate in a direction that causes the mud flap 900 to retract into the invention 100. If the first electric motor 470 is energized by electrical energy having a second polarity, the first shaft of the first electric motor 470 will rotate in a direction that causes the mud flap 900 to extend out of the invention 100.

In embodiments that comprise the second motor 480, the second shaft of the second motor 480 may drive one of the one or more right wheels 455 of the right roller assembly 420. The second motor 480 may be energized by the application of electrical energy obtained from the vehicle electrical system. The electrical energy may be applied to the second motor 480 over the wiring between the invention 100 and the vehicle electrical system. The polarity of the electrical energy determines which direction the second shaft of the second motor 480 will rotate. If the second motor 480 is energized by electrical energy having the first polarity, the second shaft of the second motor 480 will rotate in a direction that causes the mud flap 900 to retract into the invention 100. If the second motor 480 is energized by electrical energy having the second polarity, the second shaft of the second motor 480 will rotate in a direction that causes the mud flap 900 to extend out of the invention 100.

The plurality of cross-supports 520 may be rigid spacers coupled at one end to the left track 200 and at the other end to the right track 300. The number of cross-supports used may vary based upon the dimensions and weight of the mud flap 900 that is intended to be mounted to the invention 100. At a minimum, one of the plurality of cross-supports 520 couples the top, front end of the left track 200 to the top, front end of the right track 300 and one of the plurality of cross-supports 520 couples the bottom, front end of the left track 200 to the bottom, front end of the right track 300.

One or more of the plurality of cross-supports 520 may be coupled from the bottom of the left track 200 to the bottom of the right track 300 and oriented such that each of the plurality of cross-supports 520 is perpendicular to the left track 200 and to the right track 300. The plurality of cross-supports 520 in these locations may be called flap supports. The flap supports may be equally spaced from front to back along the left track 200 and the right track 300. The flap supports may provide a bottom support for the mud flap 900 when the mud flap 900 has been retracted and is oriented horizontally. Without the flap supports, the mud flap 900 may bend in the middle, pull out of the chute 530, and hang from the flap carrier on the wrong side of the chute 530—possibly touching the rear wheel 920. In that position, the mud flap 900 could not be extended to its original position.

A flap control (not illustrated in the figures) may be an electrical control that determines whether the invention 100 will retract, extended, or remain stationary.

In some embodiments, the flap control may be a switch located in the cab 950 of the truck 910. As a non-limiting example, the flap control may be a double throw, center-off switch. In the center-off position, no electrical energy reaches the invention 100 and the mud flap 900 remains stationary. In a first switch position, electrical energy having the first polarity reaches the invention 100 and the mud flap 900 retracts. In a second switch position, electrical energy having the second polarity reaches the invention 100 and the mud flap 900 extends.

In some embroilments, the invention 100 may comprise a remote control 700 and a receiver unit 750. The remote control 700 may be a hand-held plastic enclosure comprising a transmitter 705, one or more batteries 710, and a remote activation control 715. When the remote activation control 715 is used, the remote control 700 may send a signal 780 from the transmitter 705 to a receiver circuit 760 located within the receiver unit 750. The one or more batteries 710 provides electrical power to energize the transmitter 705.

The receiver unit 750 may be an enclosure comprising a control board 755 and the receiver circuit 760. The receiver unit 750 is coupled to the invention 100 in a position and orientation where it does not interfere with retraction and extension if the mud flap 900 and where it does not interfere with the rear wheel 920 or the dump bed 930. As a non-limiting example, the receiver unit 750 may be mounted at the front of the invention 100, coupled to the front end of the left track 200 and the right track 300.

The receiver unit 750 may be powered by electrical energy from the vehicle electrical system. The receiver circuit 760 may receive the signal 780 that was sent from the remote control 700 and may pass an indication of the signal to the control board 755. An input from the flap control may also reach the control board 755. The control board 755 may have direct control of the first electric motor 470 and the second motor 480, if present. The control board 755 may combine inputs to allow the flap control, the remote control 700, or both to cause retraction and extension of the mud flap 900.

The invention 100 may mount to the bottom of the dump bed 930, to support structures underneath the dump bed 930, or to extensions of the frame of the vehicle.

In some embodiments, the invention 100 may further comprise a plurality of standoffs 510. The plurality of standoffs 510 may couple to the front and rear of both the left track 200 and the right track 300 and may adapt the height of the invention 100 to the truck 910. The plurality of standoffs 510 may be required on some vehicles to position the invention 100 such that the mud flap 900 is located at an appropriate height.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used herein, "align" means to place two or more components into positions and orientations which either arranges the components along a straight line or within the same plane or which will allow the next step of assembly to proceed. As a non-limiting example, the next step of assembly may be to insert one component into another component.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may be construed to mean recharging or replacing individual cells, individual batteries of cells, or a package of multiple battery cells as is appropriate for any given battery technology that may be used. The battery may require electrical contacts, which may not be illustrated in the figures.

As used herein, a "chute" is a sloping and/or curving channel or slide for conveying things to a lower level.

As used in this disclosure, a "clip" is a fastener that attaches to an object by gripping or clasping the object. A clip is typically spring loaded.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", mean connected, either directly or indirectly and does not necessarily imply a mechanical connection.

As used in this disclosure, an "electric motor" is a device that converts electric energy into rotational mechanical energy.

As used in this disclosure, a "flap" is a piece of material that is hinged or otherwise attached to a surface using one side such that the piece of material hangs in such a way as to cover a hole in a surface or to provide a barrier between objects.

As used herein, "front" means the side of an object that is closest to a forward direction of travel under normal use of the object or the side or part of an object that normally presents itself to view or that is normally used first. "Rear" or "back' refers to the side that is opposite the front.

As used in this disclosure, to "hang" an object is to suspend an object above a surface from above such that the inferior end of the object can move freely.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, "orientation" refers to the positioning and/or angular alignment of a first object relative to a second object or relative to a reference position or reference direction.

As used in this disclosure, a "plate" is a smooth, flat and rigid object having at least one dimension that is of uniform thickness and appears thinner than the other dimensions of the object. Plates often have a rectangular or disk like appearance. Plates may be made of any material, but are commonly made of metal.

As used in this disclosure, "rigid" refers to a structure that has three-dimensional stability but that resists a decrease in internal volume when subjected to an external force. A rigid structure will behave in an elastic manner in the sense that when the external force is removed the internal volume will return to its original volume. This definition is consistent with the definition of rigid as described in the Cooperative Patent Classification system as described in section A45C. Luggage Reference As used in this disclosure, the term "shaft" is used to describe a rigid cylinder that is often used as the handle of a tool or implement. The definition of shaft explicitly includes solid shafts or shafts that comprise a hollow passage through the shaft along the center axis of the shaft cylinder, whether the shaft has one or more sealed ends or not.

As used herein, the word "substantially" is intended to mean that two or more values are the same except for a margin of error related to variances in materials, manufacturing processes, craftsmanship, installation, environmental conditions, or other factors that may influence the values and that such margin of error is tolerable.

As used in this disclosure, a "switch" is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

As used in this disclosure, a "track" is a device that is used to control the path of motion of an object in at least one dimension.

As used in this disclosure, a "vehicle" is a device that is used for transporting passengers, goods, or equipment.

As used in this disclosure, "vertical" refers to a direction that is parallel to the local force of gravity. Unless specifically noted in this disclosure, the vertical direction is always perpendicular to horizontal.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A retractable mud flap system comprising:
a left track, a right track, a chute, a flap carrier, and a plurality of cross-supports;
wherein the retractable mud flap system is attached to a dump bed of a truck above a rear wheel and is adapted to allow an operator to retract a mud flap before backing the truck, thus protecting the mud flap from damage;
wherein the retractable mud flap system extends the mud flap before traveling on roadways;
wherein the left track is a straight, metal C-channel;
wherein the length of the left track is between 25% and 125% of the vertical length of the mud flap when the mud flap is hanging;
wherein the left track is oriented such that the longest dimension of the left track runs from front to back and the open side of the C-channel faces the right track;
wherein the rear end of the left track couples to the left front side of the chute;
wherein the right track is a straight, metal C-channel;
wherein the length of the right track is between 25% and 125% of the vertical length of the mud flap when the mud flap is hanging;
wherein the right track is oriented such that the longest dimension of the right track runs from front to back and the open side of the C-channel faces the left track;
wherein the rear end of the right track couples to the right front side of the chute;
wherein the height of the right track is substantially the same as the height of the left track;
wherein the length of the right track is substantially the same as the length of the left track;
wherein the right track and the left track parallel each other and remain equidistant along their entire front-to-back length;

wherein the right track and the left track are held at the equidistant spacing by the plurality of cross-supports;

wherein the chute is a curved, hollow passage that redirects the path of the mud flap as the mud flap is retracted into the retractable mud flap system or extended from the retractable mud flap system;

wherein the width of the chute is substantially the same as the distance from the left side of the left track to the right side of the right track;

wherein the height of the front of the chute is substantially the same as the height of the left track and the height of the right track;

wherein the open end of the front of the chute is oriented to accept the mud flap in a horizontal orientation;

wherein the chute curves such that the rear of the chute is lower than the front of the chute;

wherein the open end of the rear of the chute is oriented to accept the mud flap in a vertical orientation;

wherein the left, front side of the chute couples to the rear end of the left track such that the left side of the chute and the left side of the left track are aligned;

wherein the right, front side of the chute couples to the rear end of the right track such that the right side of the chute and the right side of the left track are aligned;

wherein as the mud flap is retracted by the flap carrier, the mud flap rises vertically into the open end of the chute at the rear of the retractable mud flap system and the mud flap turns 90 degrees as it passes through the chute;

wherein as the mud flap emerges from the front of the chute, it is moving horizontally and is pulled in the space between the left track and the right track;

wherein the plurality of cross-supports on the lower side of the left track and the right track prevent the mud flap from sagging and falling in front of the chute;

wherein the flap carrier comprises a left roller assembly, a right roller assembly, a flap clip, and a first electric motor;

wherein the flap carrier moves forward and backwards in the space between the left track and the right track to retract and extend the mud flap;

wherein the left roller assembly moves forward and backwards within the left track;

wherein the left roller assembly comprises one or more left wheels;

wherein the left roller assembly couples to the left end of the flap clip;

wherein the flap clip couples to a left roller plate, and the left roller plate rotationally couples to the one or more left wheels;

wherein the first electric motor couples to the left roller plate and a first shaft of the first electric motor couples to at least one of the one or more left wheels.

2. The retractable mud flap system according to claim 1
wherein the right roller assembly moves forward and backwards within the right track;
wherein the right roller assembly comprises one or more right wheels;
wherein the right roller assembly couples to the right end of the flap clip;
wherein the flap clip couple to a right roller plate, and the right roller plate rotationally couples to the one or more right wheels.

3. The retractable mud flap system according to claim 2
wherein the flap clip comprises a first clip plate and a second clip plate;
wherein the first clip plate and the second clip plate each have a set of holes spaced from left to right across them, with each hole of the set of holes that is located on the first clip plate having a hole in a matching position located on the second clip plate;
wherein the set of holes on the first clip plate and the set of holes on the second clip plate match with holes located on the top of the mud flap;
wherein the left end of the first clip plate and the left end of the second clip plate couple to the left roller assembly;
wherein the right end of the first clip plate and the right end of the second clip plate couple to the right roller assembly.

4. The retractable mud flap system according to claim 3
wherein the mud flap is sandwiched between the first clip plate and the second clip plate such that two or more holes in the first clip plate, the mud flap, and the second clip plate align and then a plurality of nuts and bolts are passed through the aligned holes and tightened to hold the mud flap in place.

5. The retractable mud flap system according to claim 4
wherein the first shaft of the first electric motor drives one of the one or more left wheels of the left roller assembly;
wherein the first electric motor is energized by the application of electrical energy obtained from a vehicle electrical system;
wherein the electrical energy is applied to the first electric motor over wiring between the retractable mud flap system and the vehicle electrical system;
wherein the polarity of the electrical energy determines which direction the first shaft of the first electric motor will rotate;
wherein if the first electric motor is energized by electrical energy having a first polarity, the first shaft of the first electric motor will rotate in a direction that causes the mud flap to retract into the retractable mud flap system;
wherein if the first electric motor is energized by electrical energy having a second polarity, the first shaft of the first electric motor will rotate in a direction that causes the mud flap to extend out of the retractable mud flap system.

6. The retractable mud flap system according to claim 5
wherein the flap carrier comprises a second motor;
wherein the second motor couples to the right roller plate and a second shaft of the second motor couples to at least one of the one or more right wheels.

7. The retractable mud flap system according to claim 6
wherein the second shaft of the second motor drives one of the one or more right wheels of the right roller assembly;
wherein the second motor is energized by the application of electrical energy obtained from the vehicle electrical system;
wherein the electrical energy is applied to the second motor over the wiring between the retractable mud flap system and the vehicle electrical system;
wherein the polarity of the electrical energy determines which direction the second shaft of the second motor will rotate;
wherein if the second motor is energized by electrical energy having the first polarity, the second shaft of the second motor will rotate in a direction that causes the mud flap to retract into the retractable mud flap system;
wherein if the second motor is energized by electrical energy having the second polarity, the second shaft of the second motor will rotate in a direction that causes the mud flap to extend out of the retractable mud flap system.

8. The retractable mud flap system according to claim 5 wherein the plurality of cross-supports are rigid spacers coupled at one end to the left track and at the other end to the right track;

wherein one of the plurality of cross-supports couples the top, front end of the left track to the top, front end of the right track and one of the plurality of cross-supports couples the bottom, front end of the left track to the bottom, front end of the right track.

9. The retractable mud flap system according to claim 8 wherein one or more of the plurality of cross-supports are coupled from the bottom of the left track to the bottom of the right track and oriented such that each of the plurality of cross-supports is perpendicular to the left track and to the right track;

wherein the plurality of cross-supports in these locations are called flap supports;

wherein the flap supports are equally spaced from front to back along the left track and the right track;

wherein the flap supports provides a bottom support for the mud flap when the mud flap has been retracted and is oriented horizontally;

wherein the flap supports prevent the mud flap from bending in the middle, pulling out of the chute, and hanging from the flap carrier on the wrong side of the chute.

10. The retractable mud flap system according to claim 9 wherein a flap control is an electrical control that determines whether the retractable mud flap system will retract, extended, or remain stationary.

11. The retractable mud flap system according to claim 10 wherein the retractable mud flap system comprises a remote control and a receiver unit;

wherein the remote control is a hand-held plastic enclosure comprising a transmitter, one or more batteries, and a remote activation control;

wherein when the remote activation control is used, the remote control sends a signal from the transmitter to a receiver circuit located within the receiver unit;

wherein the one or more batteries provides electrical power to energize the transmitter.

12. The retractable mud flap system according to claim 11 wherein the receiver unit is an enclosure comprising a control board and the receiver circuit;

wherein the receiver unit is coupled to the retractable mud flap system.

13. The retractable mud flap system according to claim 12 wherein the receiver unit is powered by electrical energy from the vehicle electrical system;

wherein the receiver circuit receives the signal that was sent from the remote control and passes an indication of the signal to the control board;

wherein the control board has direct control of the first electric motor;

wherein the control board combines inputs to allow the flap control, the remote control, or both to cause retraction and extension of the mud flap.

14. The retractable mud flap system according to claim 10 wherein the retractable mud flap system mounts to the bottom of the dump bed, to support structures underneath the dump bed, or to arms extending from the frame of the vehicle.

* * * * *